July 2, 1963     T. M. LAAKSO ETAL     3,096,305
CONDENSATION PRODUCTS OF POLYVINYLKETONES WITH HYDRAZIDES
CONTAINING QUATERNARY NITROGEN GROUPS
Original Filed Sept. 3, 1957
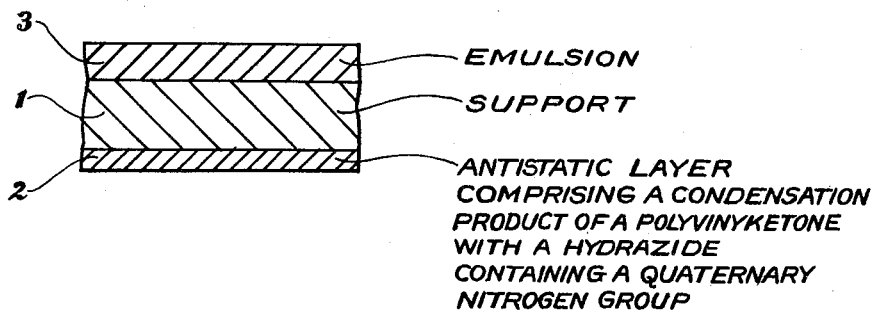
*Thomas M. Laakso*
*Jack L. R. Williams*
INVENTORS
BY
ATTORNEY & AGENT

United States Patent Office 3,096,305
Patented July 2, 1963

3,096,305
CONDENSATION PRODUCTS OF POLYVINYL-
KETONES WITH HYDRAZIDES CONTAINING
QUATERNARY NITROGEN GROUPS
Thomas M. Laakso and Jack L. R. Williams, Rochester,
N.Y., assignors to Eastman Kodak Company, Rochester, N.Y., a corporation of New Jersey
Original application Sept. 3, 1957, Ser. No. 681,603, now Patent No. 2,972,537, dated Feb. 21, 1961. Divided and this application Dec. 23, 1960, Ser. No. 78,035
5 Claims. (Cl. 260—65).

This invention relates to condensation products of certain polyvinylketones with certain hydrazides, and more particularly to quaternary salts obtained by reacting a polyalkylvinyl ketone or a polyarylvinyl ketone with a hydrazide containing a quaternary nitrogen group, for example, with Girard reagents "T" and "P" (betaine hydrazide hydrochloride and carbohydrazinomethylpyridinium chloride, respectively) to materials prepared therewith, and to processes for preparing such polymeric salts and materials.

This is a division of our copending application Serial No. 681,603, filed September 3, 1957, now Patent No. 2,972,537.

The new class of resinous polymers of the invention consist of from 70 to approximately 100% by weight in linear combination of a recurring structural unit selected from those represented by the following general structures:

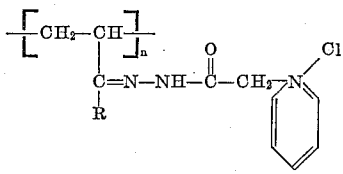

and a recurring unit of the general structure:

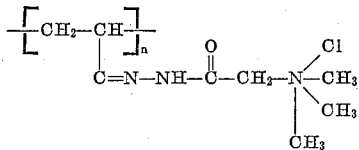

the remainder of the polymer molecule being residual vinylketone units represented by the following general structure:

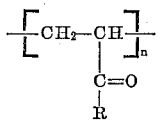

wherein in each instance $n$ represents a whole number and indicates that the unit recurs and R represents an alkyl group of 1 to 4 carbon atoms or an aryl group, e.g. methyl, ethyl, propyl, isopropyl, butyl, phenyl, o-, m-, or p-tolyl, etc. groups. The above defined quaternary salts are film-forming and have numerous uses, but are particularly valuable as antistatic coatings on sheet materials such as light-sensitive photographic films to prevent static markings and other defects produced by friction in the manufacture, use, and processing of the same. Each of the species coming within the above structures have their own particular characteristics as to their antistatic efficacy. Thus, a particular species may be preferred for one type of photographic application whereas for a different photographic application another species may be more adapted.

It is, accordingly, an object of this invention to provide a new class of polymeric compounds. A more specific object is to provide sheet materials that are antistatic in character, and more particularly photographic films that are static resistant. Another object is to provide processes for preparing such polymeric salts and coated materials prepared therewith. Other objects will become apparent hereinafter.

In accordance with the invention, we prepare the polymeric salts of the invention by reacting certain resinous polyvinylketones with a hydrazide such as with Girard reagents "T" and "P" (betaine hydrazide hydrochloride and carbohydrazinomethylpyridinium chloride, respectively) in a reaction medium such as methanol, acetone, dioxane, etc. by gentle heating and stirring in a hot water bath until the reaction is substantially completed. The resulting product is soluble in the reaction mixture but may be precipitated into a non-solvent such as diethyl ether, filtered, washed with fresh ether and dried. The solubility of the product depends on the completeness of the reaction ranging, for example, from methanol-soluble, water-insoluble for the products containing somewhat less than the lower limit of 70% of quaternized units to methanol-soluble, water-soluble for the products containing from 70% to essentially 100% by weight of quaternized units. The intermediate polyvinyl ketones of the invention may be prepared by conventional polymerization methods wherein an alkylvinyl ketone such as methylvinyl ketone, ethylvinyl ketone, butylvinyl ketone, phenylvinyl ketone, p-tolylvinyl ketone, etc. monomers are heated in the presence of a polymerization catalyst such as benzoyl peroxide, acetyl peroxide, hydrogen peroxide, ammonium persulfate, potassium persulfate, etc. in mass, in solution in an inert organic solvent or by polymerizing in emulsion form in a non-solvent such as water, the resulting polymers being separated from the polymerization reaction mixtures by conventional means such as precipitation or coagulation, filtering, washing, and drying. Advantageously, the hydrazide reagent and the starting polymer are used in equimolar amounts, but a small excess of either component is also operable in the process. If desired, the intermediate starting polymers may be copolymers of the above mentioned polyvinylketones with a lesser quantity by weight of certain other polymerizable monomers such as styrene, acrylic acid esters and amides including N-alkyl amides, and α-alkyl substituted acrylic acid esters and amides including N-alkyl amides, e.g. methyl acrylate, methyl methacrylate, acrylamide, N-methyl acrylamide, N-methyl methacrylamide, and the like. However, the polymeric quaternary salts of the invention prepared with polyvinylalkylketones are preferred. The Girard reagents may be prepared according to direction in "Organic Syntheses," Collective vol. 2, page 85 (1943), and according to Sandulesco, Helv. Chim. Acta, 19, page 1095 (1936).

The accompanying drawing is a sectional view of a photographic film base 1 composed of a hydrophobic material such as a cellulose derivative, e.g. cellulose acetate, cellulose propionate, cellulose acetate butyrate, cellulose nitrate, etc., a polyamide such as nylon, a polyester such as polyethylene terephthalate and the like, has coated thereon a polymeric salt of the invention as layer 2, and on the opposite side a layer 3 of a light-sensitive material, e.g. a gelatin-silver halide emulsion. The layer 2 of the polymeric salt may also have therein a substantial proportion of gelatin, if desired. Although the preferred method of employing the polymeric salts of the invention is in the form of a backing layer as shown in the drawing, the polymeric salts can also be incorporated directly in the sensitive emulsion layer or used as an overcoating layer over the sensitive emulsion layer to give antistatic properties to the photographic film. However, as indicated in the drawing, application of the polymeric salts to the back of the film, i.e., to the side opposite that of the sensitive emulsion layer, is preferred.

The following examples will serve to illustrate further the preparation of the polymeric salts of the invention and the application of the same to the production of light-sensitive films having excellent antistatic properties.

EXAMPLE 1

23.3 g. (0.3 mole) of polymethylvinyl ketone [$\{n\}=0.3$ in acetone] were dissolved in 300 cc. of 1,4-dioxane. To this solution there were added 57.5 g. (0.3 mole) of Girard reagent "P" (carbohydrazinomethylpyridinium chloride) and the mixture warmed on a steam bath until a test sample showed the product to be water-soluble. The viscous solution obtained by the above reaction was then precipitated into three times its volume of diethyl ether, and the amber-colored precipitate leached in fresh ether, and finally dried at reduced pressure. The yield of polymeric product was 65 g. equivalent to about 90% of the theoretical value. Analysis of this product showed that it contained by weight 52.6% of carbon, 6.6% of hydrogen, 14.9% of nitrogen and 13.4% of chlorine compared with calculated for $C_{11}H_{14}N_3OCl$ of 55.1%, 5.8%, 17.5%, and 14.8% respectively. This result indicated that the product consisted of approximately 90% by weight of recurring methylvinyl ketone pyridinium acetylhydrazide chloride units represented by the following structure:

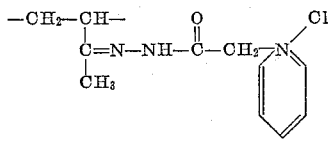

the remainder of the polymer molecule being residual recurring methylvinyl ketone units.

In place of the carbohydrazinomethylpyridinium chloride in the above example, there was substituted an equivalent amount of Girard reagent "T" (betaine hydrazide hydrochloride) to give a product containing about 90% by weight of recurring methylvinyl ketone N,N,N-trimethylaminoacetylhydrazide chloride units represented by the following structure:

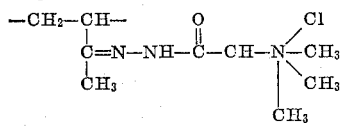

the remainder of the polymer molecule being residual recurring methylvinyl ketone units.

Also, in place of the polymethylvinyl ketone in the above example, there may be substituted an equivalent amount of any of the other mentioned polyalkylvinyl ketones or polyarylvinyl ketones of the invention to give resinous quaternary salts having generally similar antistatic characteristics and usefulness, i.e. the structural units will be the same as illustrated in the example, except that R will be ethyl, propyl, isopropyl, butyl, phenyl, etc. Thus, when R is phenyl as in polyphenylvinyl ketone and this is condensed with Girard reagent "P" as in the above example, the resulting polymer consists of from 85 to essentially 100% by weight in linear combination of recurring units of the structure:

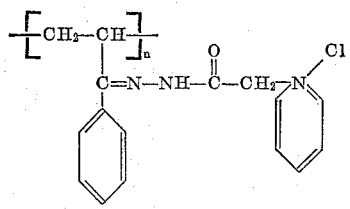

the remainder of the polymer molecule being residual phenylvinyl ketone units.

EXAMPLE 2

This example illustrates the antistatic properties of photographic films coated with the polymeric salts of the invention.

In each instance, the polymeric salt was dissolved in a mixture of acetone-methanol in a concentration varying from about 0.25–1.00% by weight of the polymeric salt, and the solution was then applied as a backing to a sheet of cellulose acetate film base by means of a dip roller and dried. This coating ranged in thickness from about 2 micrograms/cm.$^2$ for the solution of 0.25% concentration to about 10 micrograms/cm.$^2$ for the solution 1.00% concentration. The film was then further coated on the reverse side with a suitable subbing layer and a gelatino-silver halide emulsion. The following table lists the polymeric salt, the solvent combination, the concentration of polymeric salt therein, and the conductivity of the coated films.

Table

| Polymeric Salt | Solvent Wt. Ratios | Concentration, Wt. Percent | Conductivity × $10^{-10}$ mho |
|---|---|---|---|
| Product of Ex. 1 | 20 Acetone / 80 Methanol | 0.25 | 1.5 |
| Product of Ex. 1 | 20 Acetone / 80 Methanol | 0.50 | 9.1 |
| Product of Ex. 1 | 20 Acetone / 80 Methanol | 1.00 | 29.0 |

Since conductivities of the order greater than $10^{-10}$ mho have been found to alleviate difficulties from static electricity generated in the normal handling of photographic film, it will be seen from the above table that by use of the polymeric salts of the invention in appropriate concentrations and solvent combinations as coatings, films can be prepared which are free from troublesome static effects.

The values for conductivity were determined by placing two parallel electrodes on the film at a fixed relative humidity of 50%; these electrodes are long compared to the distance between them, so as to avoid end effects. The observed reading is divided by the distance between electrodes and multiplied by their length, to obtain the surface resistivity in ohms, the conductivity being the reciprocal thereof.

While the polymeric salts of the invention have been illustrated primarily in connection with their use as antistatic coatings for light-sensitive photographic films, it will be understood that coatings thereof are also efficacious in the prevention of static build up and adhesion when coated on non-sensitized surfaces such as various natural and synthetic wrapping materials. They also have utility for textile antistatic treatment and as dispersing or wetting agents. Also, various fillers, dyes, softeners, etc., can be incorporated, if desired, into the coating compositions of the invention.

What we claim is:

1. A quaternary salt of a resinous polymer consisting of from 70 to approximately 100% by weight in linear combination of a recurring structural unit selected from the group consisting of a recurring unit of the general structure:

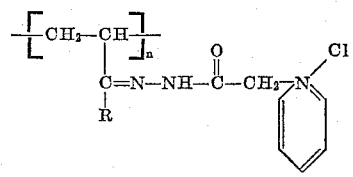

and a recurring unit of the general structure:

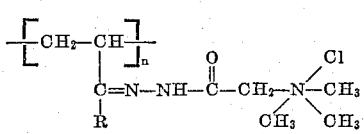

the remainder of the polymer molecule being residual vinylketone units represented by a following general structure:

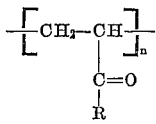

wherein *n* represents a positive whole number and R represents a member selected from the group consisting of an alkyl group of 1 to 4 carbon atoms, a phenyl group and a tolyl group.

2. A quaternary salt of a resinous polymer consisting of from 70 to approximately 100% by weight in linear combination of recurring units of the structure:

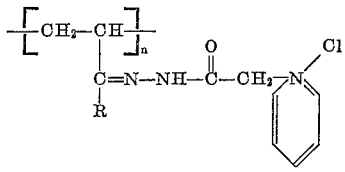

wherein *n* represents a positive whole number and R represents an alkyl group of 1 to 4 carbon atoms, the remainder of the polymer molecule being residual alkylvinyl ketone units wherein the alkyl group has the same number of carbon atoms as R.

3. A quaternary salt of a resinous polymer consisting of from 70 to approximately 100% by weight in linear combination of recurring units of the structure:

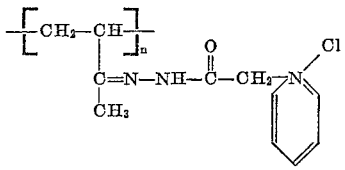

wherein *n* represents a positive whole number, the remainder of the polymer molecule being residual vinylmethyl ketone units.

4. A quaternary salt of a resinous polymer consisting of from 70 to approximately 100% by weight in linear combination of recurring units of the structure:

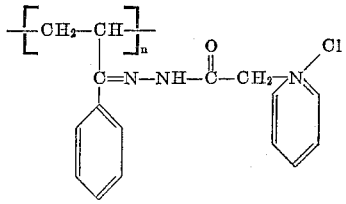

wherein *n* represents a positive whole number, the remainder of the polymer molecule being residual recurring phenylvinyl ketone units.

5. A quaternary salt of a resinous polymer consisting of from 70 to approximately 100% by weight in linear combination of recurring units of the structure:

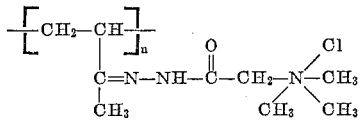

wherein *n* represents a positive whole number, the remainder of the polymer molecule being residual recurring methylvinyl ketone units.

References Cited in the file of this patent

UNITED STATES PATENTS 2,122,707     Balthis _____ July 5, 1938

OTHER REFERENCES

Organic Syntheses, Collective vol. 2, p. 85 (1943).